United States Patent [19]

Flygstad et al.

[11] 4,171,082
[45] Oct. 16, 1979

[54] TAPE GUIDE

[75] Inventors: Dean W. Flygstad, St. Paul; Michael I. Aronoff, Minneapolis, both of Minn.

[73] Assignee: Telex Communications, Inc., Minneapolis, Minn.

[21] Appl. No.: 878,251

[22] Filed: Feb. 16, 1978

[51] Int. Cl.$^2$ ............................................. B65H 23/04
[52] U.S. Cl. .................................. 226/196; 360/130.22
[58] Field of Search .................... 242/157 R; 360/128, 360/130; 226/101, 196

[56] References Cited
U.S. PATENT DOCUMENTS 3,991,956  11/1976  Machida ........................ 226/196 X

FOREIGN PATENT DOCUMENTS 2115124  10/1972  Fed. Rep. of Germany ........... 226/196

Primary Examiner—David A. Scherbel

[57] ABSTRACT

A vertically symmetrical tape guide for use on a base of a tape deck of audio-visual equipment. A locating pin on one of three triangularly spaced support members of the tape guide locates and aligns the tape guide in a hole in the base of the tape deck. A screw affixes the tape guide to the base of the tape deck. A contoured arm supports two horizontally extending fingers vertically spaced apart by the width of the tape to provide a guide for the tape when traveling across a tape head mounted to the base of the tape deck. The vertically symmetrical tape guide is configured so that the tape guide can be reciprocally mounted on either side of and adjacent to the tape head.

11 Claims, 4 Drawing Figures

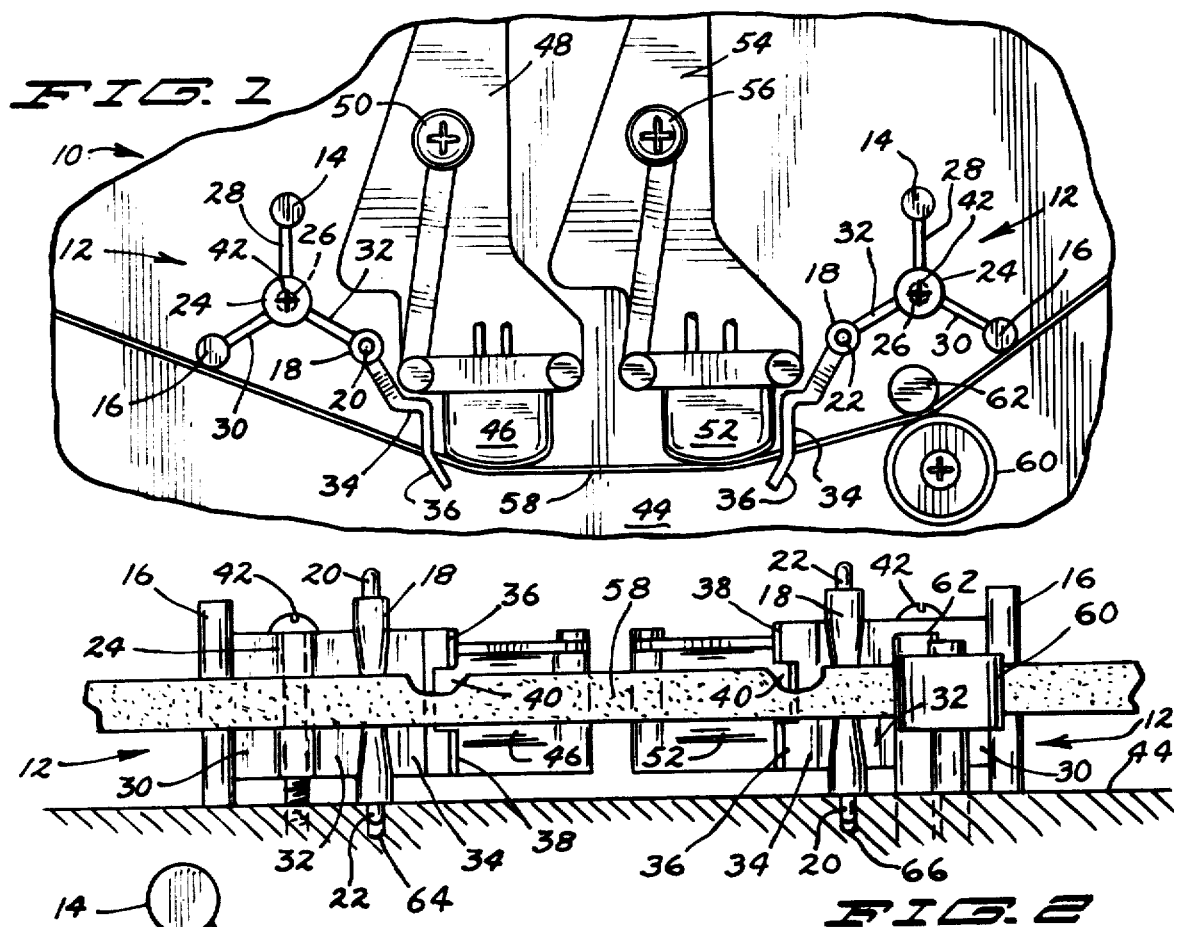
FIG. 1
FIG. 2
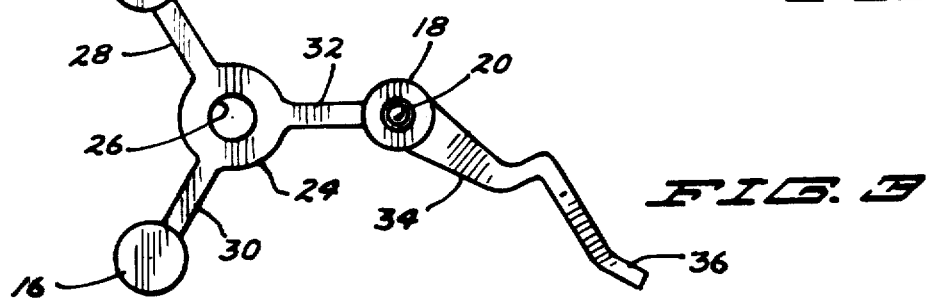
FIG. 3
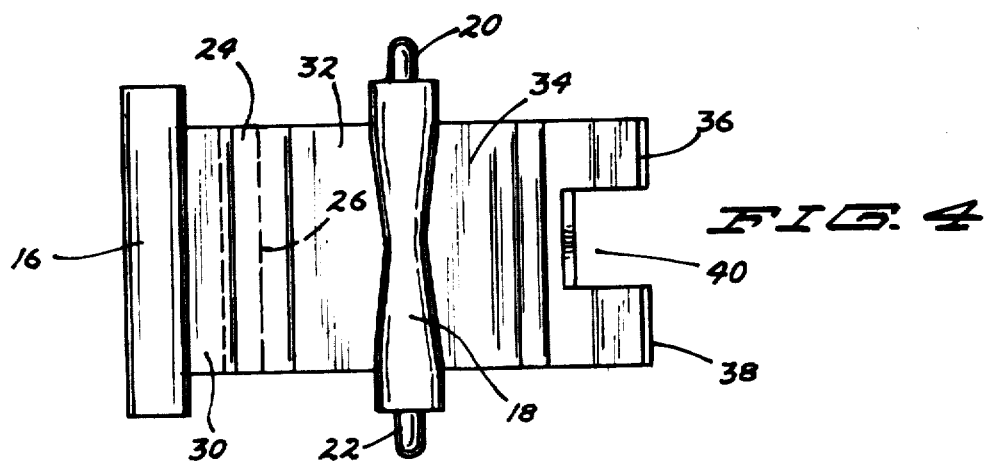
FIG. 4

4,171,082

TAPE GUIDE

BACKGROUND OF THE INVENTION

1. Field of the Invention

The present invention relates generally to improvements in audio-visual equipment, and more particularly, pertains to a new and improved tape guide for audio-visual equipment.

2. Description of the Prior Art

In the field of the audio-visual equipment, it has been a general practice to employ tape guides on both sides of a tape head assembly to guide the tape past the tape head or tape heads. Such prior art tape guides have been unsatisfactory in that the tape guides mounted on horizontal surfaces and required precise vertical alignment of each tape guide with respect to the tape head or tape heads in the tape head assembly so that tape was guided between the tape guides and past the tape head or tape heads of the tape head assembly. Also, the horizontally mounted tape guides would sometimes result in not only misalignment of the tape being guided past the tape head or tape heads, but also would cause friction wear on the tape itself. Additionally, the prior art tape guides were either stamped or pressed from sintered metal yielding tape guides having wide ranges of tolerance and being extremely expensive to manufacture. Finally, two prior art tape guides of different structure were required for each tape deck, one tape guide for mounting upstream of the tape head assembly and another tape guide for mounting downstream of the tape head assembly.

This invention provides a vertically symmetrical, low-cost, high precision, molded tape guide.

SUMMARY OF THE INVENTION

The present invention obviates the foregoing disadvantges of the prior art by providing a tape guide which is vertically symmetrical and can be utilized on either side of a tape head assembly.

According to a preferred embodiment of the present invention, there is provided a vertically symmetrical tape guide for use on a base of a tape deck and positioned upstream and downstream of at least one tape head mounted on the base of the tape deck and having three support members positioned in a triangular configuration, a mounting member positioned in between said support members, connecting members connecting said support members to said mounting member, a contoured arm having one end attached to one of said support members, and vertically spaced apart fingers extending horizontally from the other end of said arm whereby the tape is guided in between the spaced apart fingers of the tape guides past the tape head.

A feature of the present invention is a tape guide which is vertically symmetrical and can be utilized on both the upstream and downstream side of a tape head assembly.

Having briefly described an embodiment of the present invention, it is a principal object thereof to provide a new and improved tape guide.

An object of the present invention is to provide a tape guide which can be manufactured with increased precision, low cost, and out of any suitable material by way suitable method of manufacturing. Particularly, the tape guide can be molded out of engineering plastic or some form of nonmagnetic metal and manufactured with high tolerances limited only by the tolerances of the molding equipment and the appropriate material utilized. Also, it is only necessary to manufacture one structural tape guide which is utilized on both the upstream and downstream side of the tape head as the tape guide is vertically symmetrical.

Another object of the present invention is to provide a tape guide which mounts directly on the horizontal surface of the tape head assembly. A mounting screw and locating pins on one of the three support members of the tape guide provides referenced mounting directly to the surface of the tape deck regardless of the position of the tape guide in being upstream or downstream of the tape head. The tape guide can be reciprocally mounted on either side of the tape head assembly as the tape guide is vertically symmetrical, especially with regard to the upper and lower locating pins. The vertical position of the spaced apart fingers on the contoured arm attached to one of the support members of each of the tape guides is the same to provide the required vertical indexing of a tape across the tape head assembly.

BRIEF DESCRIPTION OF THE DRAWINGS

Other objects and many of the attendant advantages of this invention will be readily appreciated as the same becomes better understood by reference to the following detailed description when considered in connection with the accompanying drawing, in which like reference numerals designate like parts throughout the figures thereof and wherein:

FIG. 1 illustrates a top view of a preferred embodiment of the invention, a tape guide on a base of a tape deck;

FIG. 2 illustrates a side view of the invention;

FIG. 3 illustrates an enlarged top view of the invention; and,

FIG. 4 illustrates an enlarged side view of the invention.

DESCRIPTION OF THE PREFERRED EMBODIMENT

FIG. 1 illustrates a top view of a preferred embodiment of the invention utilized on a tape deck 10 showing two vertically symmetrical tape guides 12 mounted on the left and right sides of the tape deck 10. The tape guide 12 consists of three support members 14, 16 and 18 positioned in a triangular configuration with the support member 18 having an upper locating pin 20 and a lower locating pin 22 as shown in FIG. 2, a mounting post 24 having a mounting hole 26, and connecting members 28, 30 and 32 which connect the three support members 14, 16 and 18 to the mounting post 24 respectively. A contoured arm 34 attaches to the support member 18 and supports two horizontally extending vertically spaced apart fingers 36 and 38 as shown in FIG. 2 which are separated by a vertical gap 40. A screw 42 secures the tape guide 12 to a base 44 of the tape deck 10. A tape record head 46 is supported by a bracket 48 which is affixed to the base 44 of the tape deck 10 by a screw 50. A tape play head 52 is supported by a bracket 54 which is affixed to the base 44 of the tape deck 10 by a screw 56. A tape 58 is pulled through the vertical gap 40 and between the horizontal extending fingers 36 and 38 of the left tape guide 12 which is located upstream of the record head 46, across the record head 44, across the play head 52, through the vertical gap 40 and between the vertical extending fingers 36 and 38 of the right tape guide 12 which is located downstream of the play head 52, and is driven between a pinch roller 60 and a capstan 62, both of which are downstream of the right tape guide 12.

FIG. 2 illustrates a side view of the invention showing the partially cut away tape 58 passing through the vertical gap 40 and between the horizontal extending fingers 36 and 38 of the left tape guide 12 which is supported on the base 44 of the tape deck 10 by the three support members 16, 18 and 14 which is now shown in the figure. The hole 64 in the base 44 of the tape deck 10 accepts and aligns the lower locating pin 22 and the screw 42 fastens the tape guide 12 to the base 44 of the tape deck 10. The tape 58 then passes by the record head 46, past the play head 52, and through the vertical gap 40 and the horizontal extending fingers 38 and 36 of the right tape guide 12 which is reciprocally mounted of the left tape guide 12. The right tape guide 12 is supported on the base 44 of the tape deck 10 by the support members 16, 18 and 14 which is not shown in the figure. The hole 66 in the base 44 of the tape deck 10 accepts and aligns the upper locating pin 20 and the screw 42 fastens the tape guide 12 to the base 44 of the tape deck 10. The tape 58 is pulled between the pinch roller 60 and the capstan roller 62 to pull the tape 58 between the spaced apart fingers 36 and 38 of the left tape guide 12, across the record head 46, across the play tape guide 12, across the record head 46, across the play head 52, between the spaced apart fingers 84 and 88 of the right tape guide 12, and between the pinch roller 60 and the capstan 62.

FIG. 3 illustrates an enlarged top view of the tape guide 12. The tape guide 12 consists of the three support members 14, 16 and 18 connected to the mounting post 24 having the mounting hole 26, an upper locating pin 22 on the support member 18, and the connecting members 28, 30 and 32 which connect the support members 14, 16 and 18 to the mounting post 24 respectively. The contoured arm 34 attaches to the support member 18 and supports two horizontal extending spaced apart fingers 36 and 38 as shown in FIG. 4 which are separated by the vertical gap 40.

FIG. 4 illustrates an enlarged side view of the tape guide 12. The figure illustrates the connecting member 30 connecting the support member 16 to the mounting post 24 having the mounting hole 26, the connecting member 32 connecting the support member 18 having the upper and lower locating pins 20 and 22 respectively to the mounting post 24, the contoured arm 34 attached to the support member 18 which supports two extending fingers 36 and 38 which are separated by the vertical gap 40.

PREFERRED MODE OF OPERATION

The tape guides 12 are identical to each other in being mounted on the mirror image position of the other as shown in FIGS. 1 and 2. The three support members 14, 16 and 18 are positioned in a triangular configuration with respect to each other to provide vertical surface mounting of the tape guide 12 on the base 44 of the tape deck 10. The tape guide 12 is referenced to the mounting surface directly by the screw 42 which is accepted by the hole 26 in the mounting post 24 and by either the upper or lower locating pins 20 and 22 respectively protruding from the support member 18 to the respective screw hole for the screw 42 and either of the respective alignment holes, 64 and 66 in the base 44 of the tape deck 10. While the locating pins 20 and 22 can be positioned on any of the three support members 14, 16, and 18, the locating pins 20 and 22 are best positioned on the support member 18 for stability. The contoured arm 34 is shaped to coincide to the shape of the tape head 12 so as to permit the tape guide 12 to be placed adjacent to either tape head. The horizontally extending fingers 36 and 38 are spaced apart by the vertical gap 40 which is slightly greater than the width of the tape 58, usually a quarter inch for standard audio recording tape, for way of example and purposes of illustration only, or one half inch to one inch for video recording tape, for way of example and purposes of illustration only.

The tape guide 12 can be manufactured from any suitable material as engineering plastic such as VALOX, carboglass, or any nonmagnetic metal by any suitable manufacturing method such as molding. The vertical position of the tape guide 12 is predetermined to provide proper indexing of the tape 58 between the horizontally extending fingers 36 and 38 across the tape head. The vertical dimension of the three connecting members 28, 30 and 32 and the mounting post 24 may be less than or equal to the height of the three support members 14, 16 and 18 and is related to the vertical position of the tape head and the width of the recording tape. Also, the vertical position of the contoured arm 34 supporting the horizontally extending fingers 36 and 38 and the gap 40 is related to the vertical position of the tape 92 and the height of the tape head.

Various modifications can be made to the tape guide of the present invention without departing from the apparent scope thereof.

Having thus described the invention, what is claimed is:

1. A vertically symmetrical tape guide for use on a base of a tape deck and positioned upstream and downstream of at least one tape head mounted on the tape deck and comprising;
   a. three support means in a triangular configuration;
   b. a mounting means positioned in between said support means;
   c. connecting means between said support means and said mounting means;
   d. arm means having one end attached to one of said support means; and,
   e. spaced apart finger means extending horizontally from the other end of said arm means, whereby when a pair of tape guides are reciprocably disposed on each side of tape head, a tape is guided across a tape head and in between the spaced apart fingers of said tape guides.

2. The tape guide of claim 1 wherein said finger means are spaced apart by a vertical gap slightly greater than the width of said tape.

3. The tape guide of claim 1 wherein said tape guide comprises plastic.

4. The tape guide of claim 3 wherein said locating means comprises a pin on one end of one of said supporting means.

5. The tape guide of claim 3 wherein said locating means comprises a pin on each end of one of said support means.

6. The tape guide of claim 3 wherein said locating means comprises a pin on each end of said support means positioned between said arm means and said connecting members.

7. The tape guide of claim 3 wherein the height of said mounting means, said connecting means and said arm means is less than the vertical height of said support means but greater than the width of said tape.

8. The tape guide of claim 3 wherein said arm means is contoured to fit adjacent to said tape head.

9. The tape guide of claim 1 wherein said tape guide comprises VALOX.

10. The tape guide of claim 1 further comprising a hole centered in said mounting means whereby said hole accepts a fastener.

11. The tape guide of claim 1 further comprising locating means on one of said support means.

* * * * *